(12) United States Patent
Murray et al.

(10) Patent No.: US 9,274,862 B2
(45) Date of Patent: Mar. 1, 2016

(54) REDUCING LATENCY IN PERFORMING A TASK AMONG DISTRIBUTED SYSTEMS

(75) Inventors: Neil Hamilton Murray, Northamptonshire (GB); Simon Paul Tyler, Wiltshire (GB)

(73) Assignee: Mimecast North America Inc., Watertown, MA (US)

( * ) Notice: Subject to any disclaimer, the term of this patent is extended or adjusted under 35 U.S.C. 154(b) by 353 days.

(21) Appl. No.: 12/964,219

(22) Filed: Dec. 9, 2010

(65) Prior Publication Data

US 2012/0151003 A1 Jun. 14, 2012

(51) Int. Cl.
*G06F 15/16* (2006.01)
*G06F 9/54* (2006.01)

(52) U.S. Cl.
CPC .......... *G06F 9/547* (2013.01); *G06F 2209/544* (2013.01)

(58) Field of Classification Search
CPC .................................................... H04L 67/101
USPC .......................................... 709/201–203, 236
See application file for complete search history.

(56) References Cited

U.S. PATENT DOCUMENTS

| | | | | |
|---|---|---|---|---|
| 5,504,900 | A * | 4/1996 | Raz | |
| 6,151,709 | A * | 11/2000 | Winkel | 717/173 |
| 7,930,339 | B2 * | 4/2011 | Tobita et al. | 709/202 |
| 2002/0065870 | A1 * | 5/2002 | Baehr-Jones et al. | 709/201 |
| 2002/0091708 | A1 * | 7/2002 | Vos et al. | 707/104.1 |
| 2003/0225899 | A1 * | 12/2003 | Murphy | 709/230 |
| 2007/0174185 | A1 * | 7/2007 | McGoveran | 705/39 |
| 2008/0307385 | A1 * | 12/2008 | Dreiling et al. | 717/108 |
| 2010/0174579 | A1 * | 7/2010 | Hughes | 705/9 |
| 2010/0293235 | A1 * | 11/2010 | Cadoret et al. | 709/206 |
| 2011/0167221 | A1 * | 7/2011 | Pangal et al. | 711/117 |
| 2012/0005530 | A1 * | 1/2012 | Marathe et al. | 714/19 |
| 2012/0030273 | A1 * | 2/2012 | Allen | 709/203 |

OTHER PUBLICATIONS

"A real web service for the RCX Documentation," Jun. 7, 2005 [online], [retrieved on Oct. 1, 2010]. Retrieved from the Internet: http://users.skynet.be/pascalbotte/rcx-ws-doc/xmlpost.htm, 3 ages.

"JSON-RPC Specifications," 2005 [online], [retrieved on Oct. 1, 2010]. Retrieved from the Internet: http://json-rpc.org/wiki/specification, 3 pages.

Marshall, Dave, "Remote Procedure Calls (RPC)," Jan. 5, 1999 [online], [retrieved on Oct. 1, 2010]. Retrieved from the Internet: http://www.cs.cf.ac.uk/Dave/C/node33.html, 15 ages.

Oracle, "ONC+ Developer's Guide," 2010 [online], [retrieved on Oct. 1, 2010]. Retrieved from the Internet: http://docs.sun.com/app/docs/doc/816-1435/6m7rrfn85?1=en&a=view, 3 pages.

(Continued)

*Primary Examiner* — Jason Recek
(74) *Attorney, Agent, or Firm* — Fish & Richardson P.C.

(57) ABSTRACT

Among other things, at a client computer system in communication with a computer network, a request object is generated that includes logic to control the handling of requests. At least one of the requests depends on (for example, simply by being part of a sequence) a result of at least one of the other of the requests. The request object is sent to a server computer system that is in communication with the computer network. A response object is received that includes results of at least some of the requests.

21 Claims, 4 Drawing Sheets

(56) References Cited

OTHER PUBLICATIONS

Figure 1:
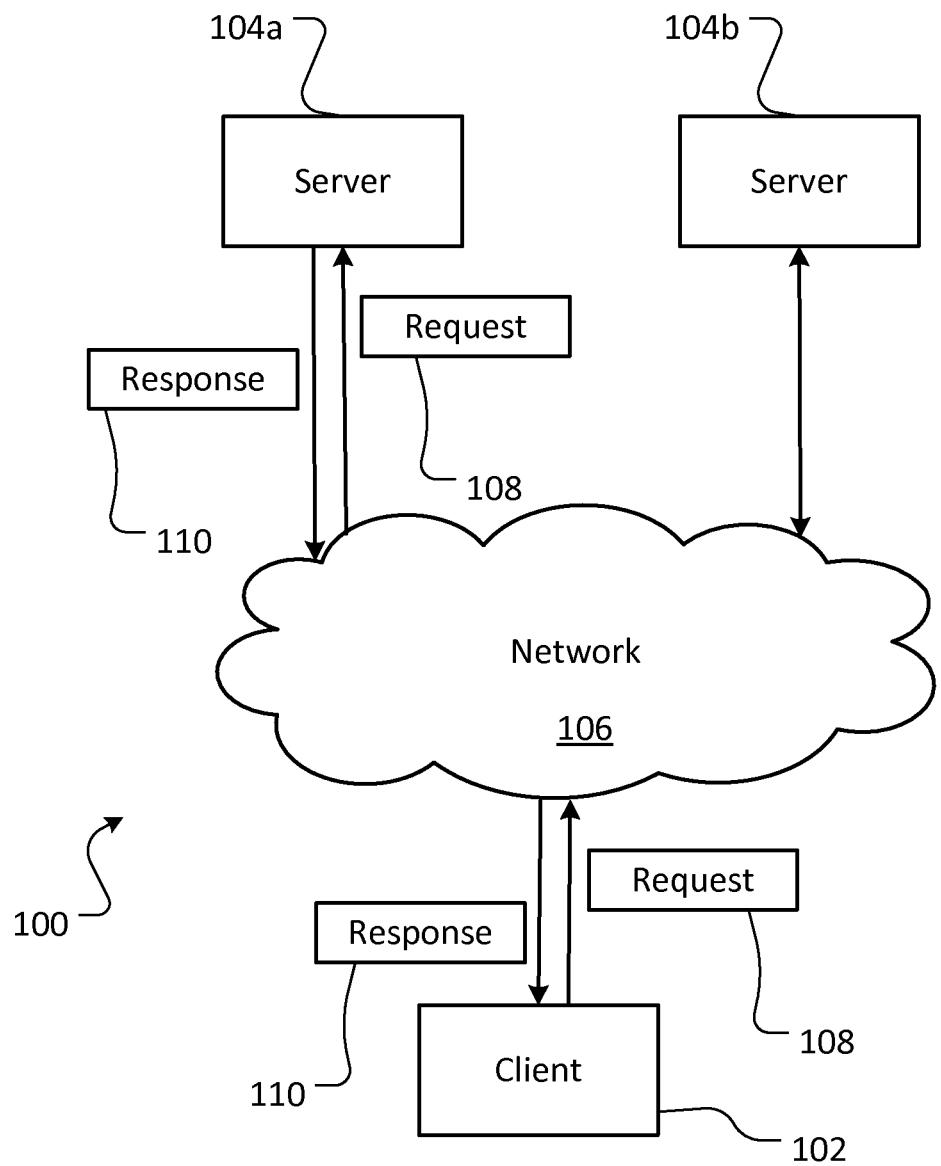

White, Jame E., "A High-Level Framework for Network-Based Resource Sharing," Dec. 23, 1975 [online], [retrieved on Oct. 1, 2010]. Retrieved from the Internet: http://tools.ietf.org/html/rfc707, 30 pages.

Winer, Dave, "Bob Atkinson on RPC over HTTP-POST," Apr. 20, 1998 [online], [retrieved on Oct. 1, 2010]. Retrieved from the Internet: http://www.scripting.com/98/04/stories/bobAtkinsonOnHttpPost,html, 2 pages.

Winer, Dave, "XML-RPC Specification," Jun. 15, 1999 [online], [retrieved on Oct. 1, 2010]. Retrieved from the Internet: http://www.xmlrpc.com/spec, 7 pages.

Borenstein, Nathaniel S., "Email with a Mind of Its Own: The Safe-Tcl Language for Enabled Mail," IFIP WG 6.5 Conference, Barcelona (May 1994), North Holland, Amsterdam (1994). Reprinted in *Upper Layer Protocols, Architectures, and Applications*, M. Medina and N. Borenstein, editors, North-Holland (1994). Reprinted in Readings in Agents, M. Huhns and M. Singh, editors, Morgan Kaufmann (1998), 14 pages.

Borenstein, Nathaniel, "MIME Extensions for Mail-Enabled Applications: application/Safe-Tcl and multipart/enabled-mail" (Oct. 1993) [online], [retrieved on Sep. 9, 2013]. Retrieved from the Internet: http://citeseerx.ist.psu.edu/viewdoc/summary?doi=10.1.1.31.3265, 2 pages.

\* cited by examiner

REDUCING LATENCY IN PERFORMING A TASK AMONG DISTRIBUTED SYSTEMS

BACKGROUND

This description relates to reducing latency in performing a task among distributed systems, for example, in a network.

Such tasks can include synchronizing data stored on the distributed systems, or providing information or a service among the distributed systems, for example, between a server and a client.

An individual task may include only a single step performed at one of the distributed systems on behalf of, for the benefit of, or at the request of another one of the distributed systems. In some cases, however, a task may be complex, including many steps, such as a series of discrete requests and responses among the distributed systems. To complete a task, the distributed systems exchange communications through the network.

Generally, each step of a task entails two separate communications through the network, one that passes from one of the distributed systems to the other and contains a request, and the other of which contains the result and returns in the other direction. A task that involves more than one step will typically involve more than two communications, sometimes many.

For example, a client may first send an initial request to a server, which processes the request and sends an interim result back to the client. Sometimes, based on the nature of the interim result, the client may then send a second request, the server returns another interim result, and the back and forth continues until the client eventually receives the needed data or service, that is, until the task is completed.

There are latencies (time delays) in performing a task, including each of its steps. A variety of terminology has been used to refer to the different latencies involved. Reference is made to the explanation of latencies contained in the Wikipedia entry "Latency (engineering)" found at http://en.wikipedia.org/wiki/Latency_%28engineering %29 or http://tinyurl.com/c5egob, incorporated here by reference in its entirety in the form in which it appeared as of the filing of this patent application.

Here, we sometimes use the phrase "task operational latency" to refer to the entire time that elapses from the start of the task until the end of the task, including all of the processing and communication time entailed in completing every step needed to finish the task. Similarly, we call the time required to complete a step of the task "a step operational latency."

In the example of a request made by a client to a server, the step operational latency includes the times required to prepare the request at the client and the reply at the server, and to decode the request at the server and the reply at the client, the time spent by the server to perform the requested action, and the communication latency for the communication (e.g., the request and the reply) transmitted between the client and the server to initiate and to finish that step of the task.

By communication latency, we mean, for example, the time spent to send a communication through a network, from the system that initiated the communication (e.g., the client) to the system that is to act on the contents of the communication (e.g., the server), and back again, without including any step operational latency that may occur at the server.

SUMMARY

In general, in an aspect, latency is reduced between a beginning and an end of a task that is to be performed between at least two systems coupled to a network, and in which performance of the task involves at least two steps to be communicated, from one of the systems, that are to be handled by another of the systems. One of the two steps has a dependency related to the handling of the other of the two steps, for example, an ordered sequencing. A package is formed that encompasses at least two of the steps and includes logic that will control the handling of the one step at the other system, based on the dependency related to the handling of the other step at the other system. The package is sent in a single communication over the network from the one system to the other system and at least one corresponding result is received from the other system.

Implementations may include one or more of the following features. One of the systems may be a client, and the other may be a server. At least one of the requests may be handled by accessing a database at the other system. The two requests may have an order in which they are to be handled. The package may include an object for use in an object-oriented programming system. The logic may be interpretable at the other system. The result may be received from the other system all at once. The result may be received from the other system incrementally as the requests are handled. The handling of the one step at the other system may include primitive operations to be performed at the other system, and a database transaction may extend across two or more primitive operations, or across two or more packages sent to the other system, or both. The included logic may include instructions for optimizing searches based on the location of records in a distributed database or data store.

In an aspect, in general, at a client computer system in communication with a computer network, a request object is generated that includes logic to control the handling of a plurality of requests and to enable a server computer system to sequence or decide on execution of the requests. At least one of the requests depends on a result of at least one of the other requests, for example, as an ordered sequence. The request object is transmitted to a server computer system in communication with the computer network, and a response object is received that includes results of at least some of the plurality of requests.

Implementations of these aspects may include one or more of the following features. The request object may include at least one reference to an executable function available at the server computer system. At least one of the requests may not depend on a result of any of the other requests. At least one of the requests may include a database query and at least one of the results includes a result of the database query. At least one of the requests, that depends a result of at least one of the other of the requests, may include a second request depending on data generated by a function associated with a first request. The second request may not execute depending on a value represented by the data generated by the function associated with the first request. The results may be returned incrementally as the requests are handled. The results may be returned all at once after all the requests are handled. Instructions may be defined in an object-oriented programming language. The request object may be defined in an object-oriented programming language. The included logic may include instructions for optimizing searches based on the location of records in a distributed database or data store.

These and other aspects and features, and combinations of them, may be expressed as apparatus, methods, systems, and in other ways.

DESCRIPTION

Figure 2:
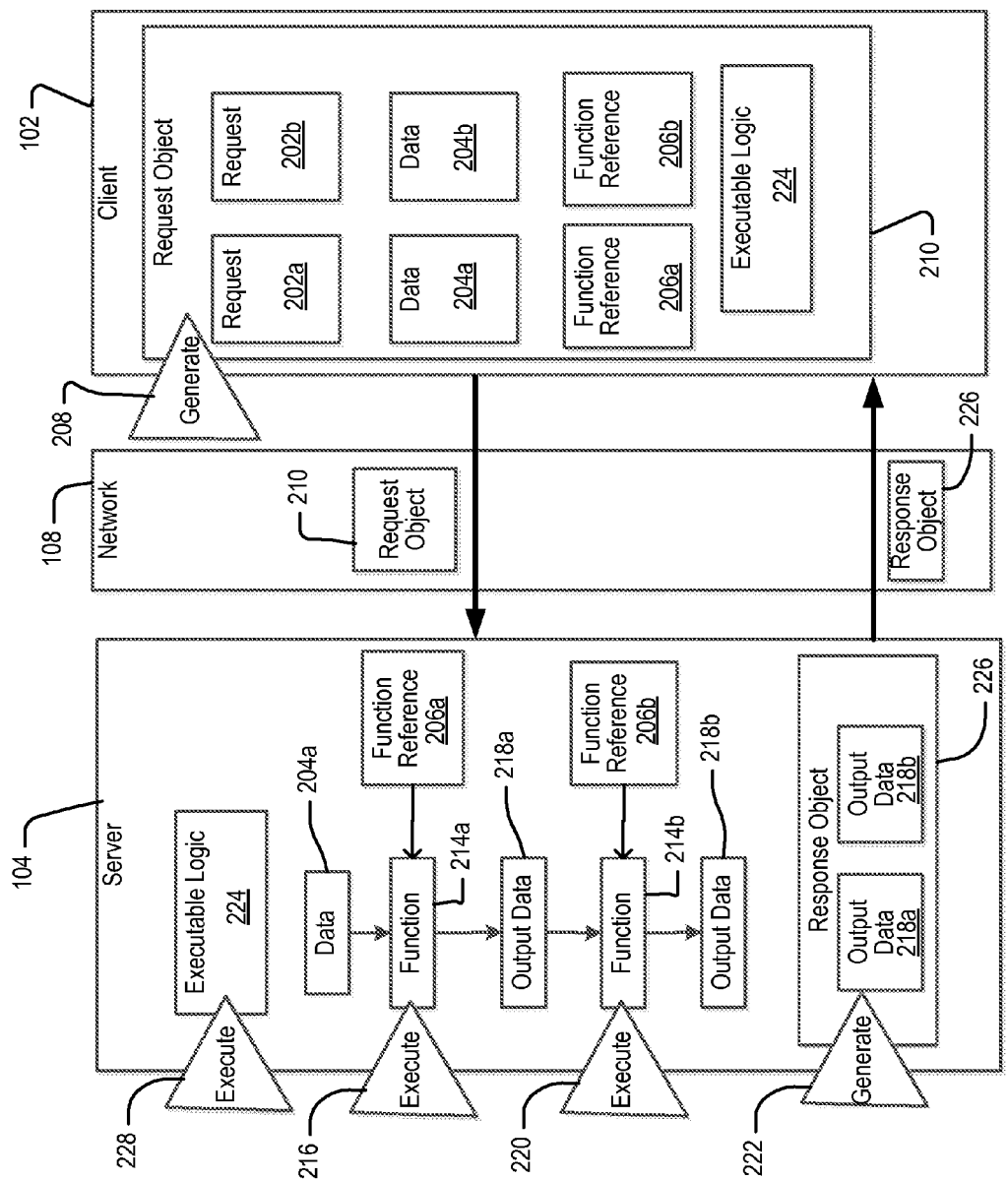
Figure 3:
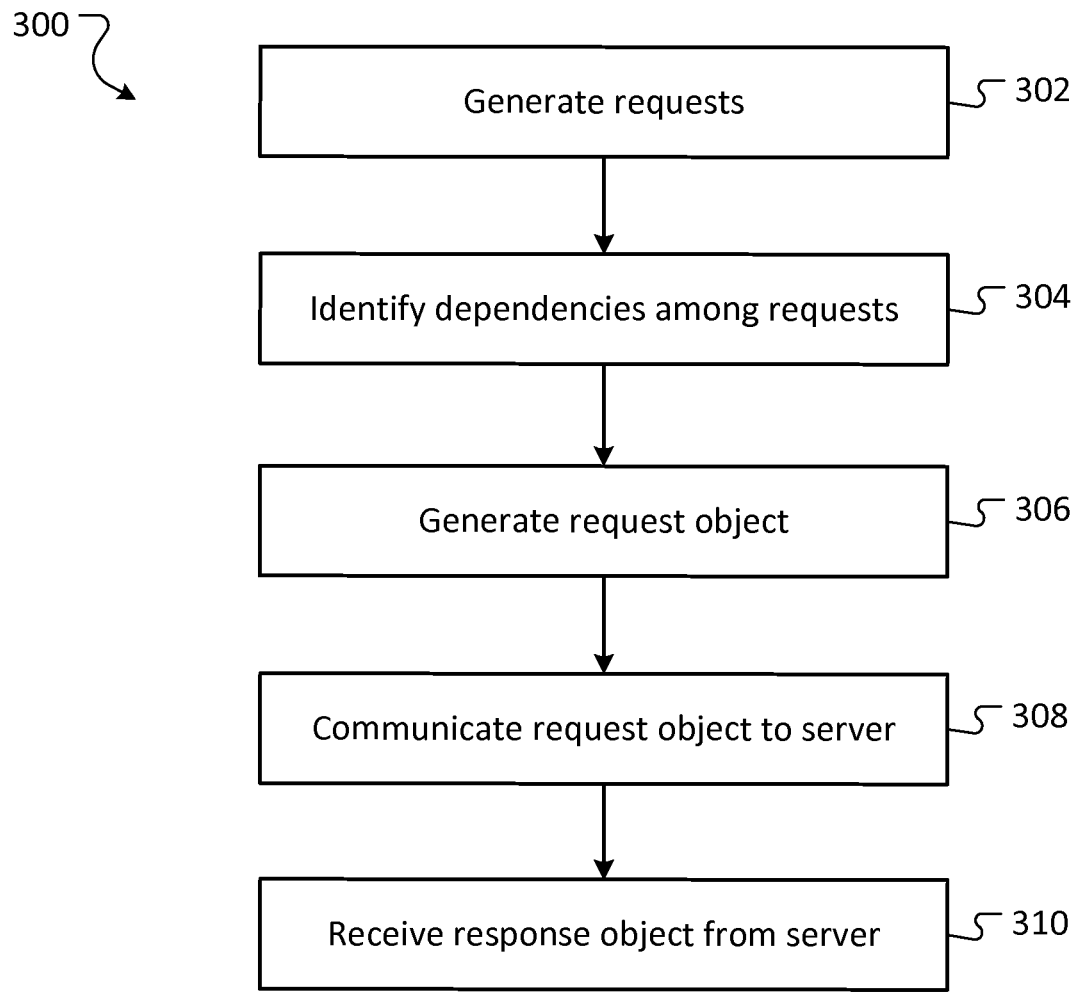
Figure 4:
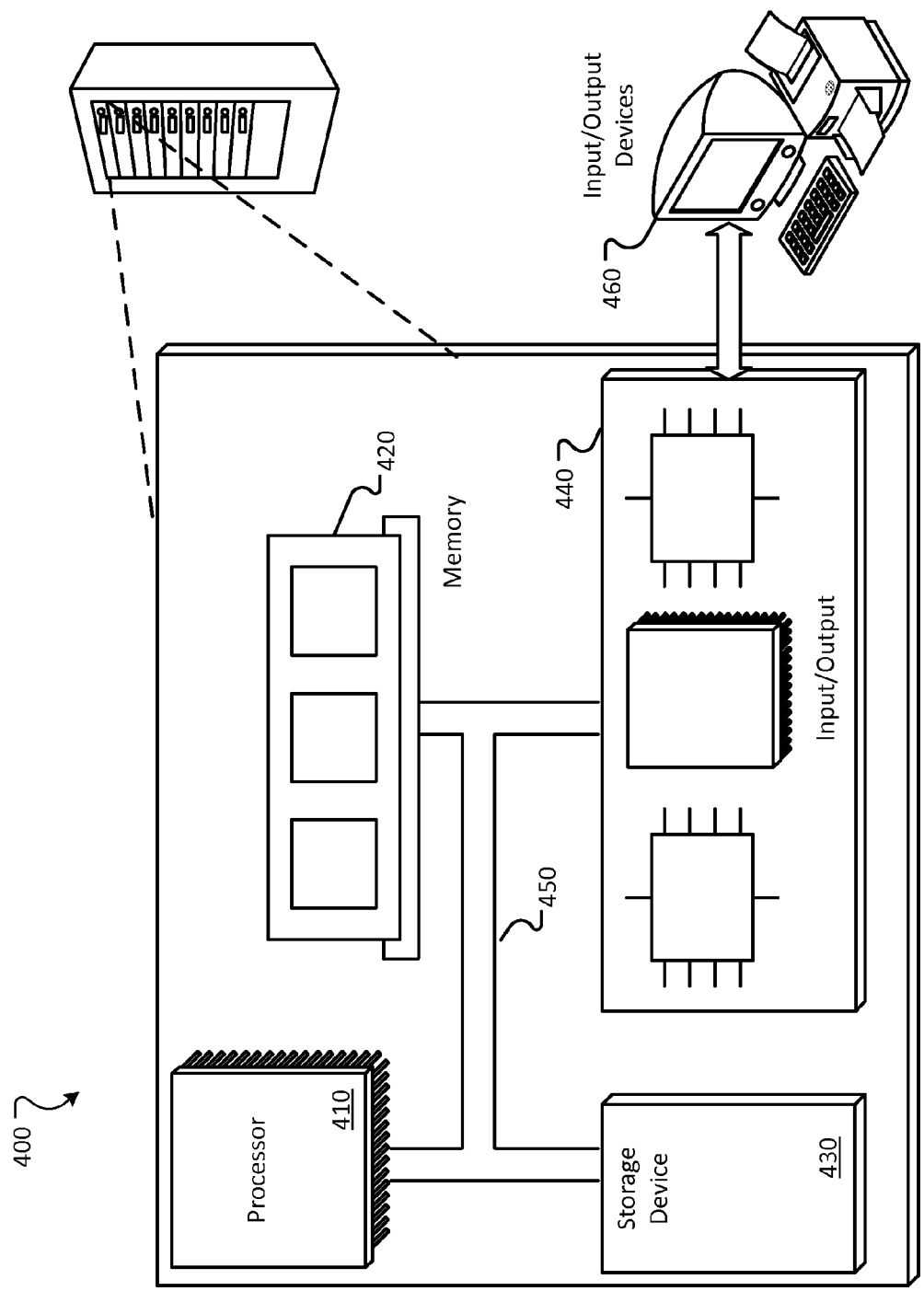

FIG. 1 is a block diagram of a network.
FIG. 2 is a diagram of a task being performed.
FIG. 3 is a flowchart of an example process for performing a task.
FIG. 4 is a block diagram of an example computer system.

The task operational latency and the cost of performing a task among two or more systems on a network, can be lowered by reducing the sum of the communication latencies, which in turn can be done by reducing the number of separate communications (e.g., communications that contain requests and replies to requests) that must be completed to perform the task.

The number of separate communications can be reduced by organizing the task steps that each might otherwise require its own communications into groups of steps and sending each group together in a single aggregated communication from one system to another, accompanied by code that enables potentially complex execution sequencing decisions to be made on the system that receives the aggregated communication, e.g., on the server side.

In the example network 100 of distributed systems of FIG. 1, a client 102 (an example of a client system or, more broadly, a system) and servers 104a, 104b (examples of server systems, or more broadly systems) can communicate using a network 106, to perform one or more tasks and steps of tasks. In FIG. 1, directions of arrows indicate directions of flows of communications into or out of the network 106 in connection with the performance of the steps and tasks.

The network 106 can be any kind of network that couples two or more distributed systems, for example, a local area network (LAN), a wide area network (WAN), the Internet, a wired network, a wireless network, or other networks. Some of the systems may be connected to the network by network cables, and some of the systems may be connected to the network by radio frequency (RF) transceivers (not shown) that operate over a wireless medium. The network 106 may also have many intermediate links between any two systems, including wired links and wireless links, and intermediate systems interfacing with the links such as routers, switches, and base stations. In some examples, the systems (e.g., the client and server systems) store data in databases and the tasks can involve synchronizing the data among the systems, or engaging in transactions involving the data, or finding or fetching data from one system to others. The range, kinds, and volume of tasks that can be performed by cooperation of two or more of the systems through the network is essentially unlimited.

In many examples, a task includes a series of steps such as requests sent (in network communications) by a source system and replies returned (in network communications) by target systems after processing the requests. Often, the source system sends a first request, the request is processed at the target system and data that results from processing the request is returned in a reply (which we sometimes call an interim reply) to the source system. Sometimes, based on the nature or content of the reply, or both, the source system executes logic to determine a second request to send as part of performing the task. The target system processes the second request and returns a reply. And the sequence repeats until the task is completed.

The number of requests (steps) that are used to complete a task may be large (even very large) and complicated. The logic used to determine the next request in the sequence based on the prior reply or the prior replies and requests, can be simple or complex. And the volume of data carried in each reply can be small or large (or very large).

As mentioned, in general, requests and replies are carried through the network in communications, using typical public or proprietary network protocols. To complete tasks, communications may carry other kinds of information or instructions in addition to requests and replies.

In the network 106, the communication latency depends on physical limitations, such as the speed of electronic signals traveling in the network medium, the delay imposed by processing at devices on the network such as routers or gateways, and the network organization, which can cause the communication to traverse a long, complex path through the network 106. Some of these delays can potentially be reduced by network engineering, but the speed of light itself defines a delay of an irreducible duration that can be significant.

In addition to the communications latency, each step that is part of the task and is communicated through the network is subject to processing latencies that include (a) the delay imposed by the process of forming a request and embedding it in a communication (at the source system) and (b) the delay imposed by the process of unpacking the communication, interpreting the request, executing the logic, embedding the resulting data in a communication, and starting the communication on its way through the network back to the source system.

We sometimes refer to the latency (including the communication latency) that occurs from the time when the source system begins to work on a step of a task (such as a request) until the target system completes its processing of the logic for that step, and obtains the result, a "step operational latency" or, in this example, the "request operational latency". By analogy, the "reply operational latency" is the latency (including communications latency) between the time when the target system has bundled the resulting data into a communication and launches it towards the source system, until the source system unpacks it, interprets it, and is ready to start working on the next step of the task. As mentioned earlier, the task operational latency is the entire time that elapses from when the source begins to work on the task until the task is completed, which includes the latencies of all of the requests and replies (or other steps) that make up the task.

In the example of FIG. 1, the request operational latency for each request 108 and the reply operational latency for each response 110 (we often use the words reply and response interchangeably) slow down the completion of the associated task between the client 102 and the server 104a.

The more requests and replies (or other steps) that are performed to complete a task, the longer the task operational latency. In network arrangements in which geographically distributed systems are engaging in a very large number of tasks at a high frequency, communications latency can be a significant cost and can reduce the ability of the systems to do their jobs efficiently.

As described here, the communication latency for a task (and therefore, of course, the entire task operational latency) can be reduced (sometimes very significantly) by bundling what would otherwise be multiple successive requests (and in some cases, also bundling the logic needed to control the handling of each successive request based on the results of one or more prior requests) into a request package to be sent as a single aggregated communication from the source system to the target system.

Conversely, what would otherwise be multiple successive replies from a target system to a source system can be bundled into a single reply package to be sent as a single aggregated communication from the target to the source. Or, a single reply package may sometimes be sent that contains a result from processing of successive requests of a request package at the target. If the source does not need to respond to received replies, the replies can also be sent to the source as they are made ready by the target without incurring additional operational latency.

Sending interim replies from the target to the source (rather them bundling all of them and sending the bundle after all of the replies have been generated) yields important time savings at the client.

By analogy, imagine a guest at a restaurant who wants an asparagus salad for an appetizer, a lamb chop for an entrée, and baked Alaska for dessert. Suppose the restaurant is only able to cook the lamb chop after the salad has been prepared and to cook the baked Alaska only after the lamb chop has been prepared. To accommodate this limitation in the kitchen, it would be possible for the restaurant to require the guest not to order the lamb chop until she finishes the salad, nor the dessert until she finishes the lamb chop, but that would leave her unnecessarily hungry between courses, while waiting for the next course to arrive. It would also require three trips to the kitchen by the waiter. Alternatively, the restaurant could accumulate all of the courses in the kitchen and deliver them all at once when the cooking was finished. That could be done by a single order, saving the waiter time, but that would leave her hungry for a long period and then overloaded with food to eat at the end of the process.

A third approach, which is analogous to the one described here for sources and targets, would be for her to send one order to the kitchen saying "prepare the salad and then send it out right away, then prepare the lamb chop and send it out right away, then prepare the dessert and send it out right away." In this way, she has both saved trips to the kitchen by the waiter and reduced the amount of time spent sitting at the table hungry.

In the case of a source and a target, by analogy, the point is that the communication is being done on behalf of and for the benefit of the client, and there is usually not much downside to returning interim results to the source (client) as fast as possible, so that the client can get to work processing them. Therefore, while the reduction in communication latency that results from batching together the requests is important, batching together the replies that go back to the client would force the client to wait longer than necessary for most of the interim replies to come back (and be processed). Because the client cannot process all of the replies at once anyway, it is generally not useful to force the client to wait to receive a reply communication that contains all of the replies at once.

We use requests and replies as examples, but the same explanation applies to all kinds of steps of tasks, and combinations of them.

We also note that, in some implementations, control code can be sent along with one or more of the requests to the server that provides programmatic instructions to the server on what to do next depending on the outcome of the processing of the request.

In our restaurant analogy, this would correspond to the diner adding some instructions to the order such as: "I want to choose the vegetable stew, unless it contains eggplant (to which I'm allergic), in which case I want the pizza." Instead of making the waitress run to the back to find out if there's eggplant in the stew, and then come to finish taking her order, she can give a programmatic order that tells what to do depending on whether or not eggplant is part of her first choice entree.

Although we often refer to a task or a step as being performed by only a pair of systems and we call the systems a source and a target, similar techniques can be used to reduce task latency for tasks that are performed by sets of more than two systems, and in contexts in which each system need not be referred to as a source or a target. Each system might function sometimes as a source or client, and other times as a target or server.

Thus, for example, although a task can be performed by a client and a corresponding server, in some implementations, the task can be performed between one server and another server. For example, one server 104a can send request communications 108 to, and receive response communications 110 from, another server 104b.

FIG. 2 is a diagram of an example implementation of communications between a client 102 and a server 104 to complete steps of a task on a network 106. The client 102 has multiple requests 202a, 202b to be processed by the server in order to complete the task. Each of the requests 202a, 202b may be associated with data 204a, 204b. For example, one or more of the requests 202a, 202b may be for the server 104 to perform one or more operations on or using the data 204a, 204b. Also, one or more of the requests 202a, 202b may be associated with a function reference 206a, 206b to the identity of an executable function available on the server 104. In some implementations, the function reference 206a, 206b is a text string or other identifier.

The requests 202a, 202b can be any type of request (or step) that a server 104 would be able to handle. For example, the server 104 may be a database server, and the requests 202a, 202b may be queries for information contained in a database at (or accessible at) the database server. In some implementations, the requests are Structured Query Language (SQL) queries or another kind of database query defined in a database query language. The requests need not be all the same type; for example, one request 202a could be a database query and another request 202b could be a kind of request or action of any kind other than a database query, such as an e-commerce transaction, a file system operation, a remote management operation, or an email submission, retrieval, alteration, or management operation.

The client 102 generates 208 a request object 210 and incorporates the requests 202a, 202b and their associated data 204a, 204b (if any) and function references 206a, 206b (if any) in the request object 210. For example, the request object 210 can be an object defined in an object-oriented language such as Java, and the requests 202a, 202b, data 204a, 204b, and function references 206a, 206b can be members of the object or data structures within the object. In some implementations, the request object 210 is a hash table such as a Java HashMap. A wide variety of other implementations of the request object are possible, including objects that are not expressed as objects in the object oriented programming sense.

If the request object 210 is defined in a language such as Java that implements data types, the request object 210 need not be typed according to the contents of the object. The request object 210 can be assigned a type that identifies it as a request object but does not further specify information about the object. Any request object 210 can be used with any client and any server. Note that we sometimes refer to the request object as a request package and the response object 226 as a reply package, to indicate that they may include multiple requests or responses and also sequencing logic for remote execution.

In some implementations, the request object 210 incorporates executable logic 224 (e.g., programming code, such as a function) that can be executed by the server when the requests 202a, 202b are being handled. The executable logic 224 may identify how one or more of the requests 202a, 202b may depend upon other requests and upon the results generated by other requests, for example, by simple sequencing. The executable logic 224 can be of a kind that would otherwise have been handled by the client as replies to the individual requests came back from the target, but is now instead handled by the server. This logic may be written in any programming language, including an object-oriented language, a scripting language, a functional language, a logic programming language, a machine language, an assembler language, a restricted language, or any other programming language.

The client 102 can send the request object 210 through the network 106 to the server 104 in a communication (represented by the dark arrow-headed line). For example, the request object 210 can be sent using a network protocol that both the client 102 and the server 104 are capable of using to communicate. In some implementations, the network protocol is Hypertext Transfer Protocol (HTTP).

The server 104 identifies the requests 202a, 202b in the request object 210 and handles each of them. In some implementations, the request object 210 identifies (or by virtue of the executable logic or the way the requests are ordered in the format of the request object, implies) an order in which to handle the requests 202a, 202b. As mentioned earlier, the result of handling one request 202a may affect the way another request 202b is handled. For example, the server 104 may handle one request 202a by executing 216 a a function 214a identified by a function reference 206a. (The identification of a function by a function reference is shown by an open-ended arrow in the figure. In general when we refer to a function, we mean a method in the broadest sense, for example, the actual code that makes up the function. By a function reference, we mean, for example, a call to the function, either explicitly or implicitly in information carried in the request object.)

The function 214a may use the data 204a associated with the request (and may also use data available at the server, for example) to produce output data 218a (which we sometimes also call results). (The relationship between a function and its data is shown by a closed-ended arrow in the figure.) Although the example shows the execution of functions 214a, 214b associated with the requests 202a, 202b, in some examples, the requests are not associated with functions and the server handles the requests in a way that does not include function execution.

To be correctly handled, the second request 202b may depend on the output data 218a. For example, a function 214b (identified by the function reference 206b associated with the second request 202b) may be executed 216 in a manner that depends on the output data 218a from the first function 214a. The function 214b can accept the output data 218a as input, or the function 214b may or may not execute 220 depending on the output data 218a. For example, if the output data 218a includes a numerical value, the function 214b may not be executed if the numerical value exceeds or falls below a certain threshold. If the output data 218a includes a logical value such as "true" or "false," the function 214b may not be executed of the logical value does not meet a specified condition. In some implementations, the request object 210 executes 228 the executable logic 224 to determine whether or not a request 202b depends upon another request 202a, and the manner in which the requests depend upon each other.

Because the request object 210 contains multiple requests 202a, 202b, the server 104 need not report back to the client 102 to indicate the result 218a of one request 202a before another request 202b is handled, even if the second request 202b depends upon the first request 202a. Above and elsewhere when we refer to a request depending upon another request, the dependency may be as simple as, for example, the fact that the requests appear in a sequence.

In some implementations, the server 104 can transmit the first result 218a to the client 102 before handling the second request 202b. In these implementations, the server 104 need not wait for the client 102 to act in response to receiving the first result 218a, but instead the server 104 can continue on to process the second request 202b. In some implementations, the request object 210 may also specify other information about the requests 202a, 202b. For example, the way in which the requests 202a, 202b are handled may depend on resources available at the server 104, and the request object 210 can indicate that the requests 202a, 202b can be handled in one way if certain resources are available, and another way if certain resources are not available. The server 104 can access and use this information when handling the requests 202a, 202b. Also, the request object 210 can specify information about the data 204a, 204b associated with the requests 202a, 202b. The server 104 may use the data 204a, 204b in a way that depends on resources available at the server 104. For example, the server 104 may have a database or look-up table that contains a more recent or more comprehensive version of the data 204a, 204b, and the request object 210 can indicate to the server 104 to use a version of the data 204a, 204b available in the database or look-up table if such a version is available.

Once the requests 202a, 202b have been handled by the server 104 (for example, when the server has completed all of the requests that it is able to and should complete and has generated a final result), the server 104 generates 222 a response object 226 (for example, another object defined in an object-oriented language) to return to the client 102. The server can assign output data 218a, 218b to the response object 226, for example, if any of the requests 202a, 202b included a directive to return the output data to the client 102.

In some implementations, rather than use a single response object 226, the server 104 can assign the first output data 218a to one object and transmit the object, and can later assign the second output data 218b to another object and transmit the other object. The manner in which the server transmits the output data 218a, 218b can depend on whether the client 102 expects to receive the output data as it is generated, or collected together when the task is completed by the server 104.

The server 104 sends the response object 226 through the network 106 to the client, which can then engage in further processing based on the contents of the response object 226.

Although the example discussed above included only two requests, the request object can include more (in fact, many more) requests in a single request package. The request object can include all of the requests needed to perform a task. Or, in some implementations, the client can assemble the requests in more than one group and send a request object for each of the groups. In some cases, it will be possible for the server to handle some successive requests without client assistance, but not all of the requests that are needed in order to complete a task. In those cases, and possibly others, the client may need to execute some logic after a group of the requests have been performed at the server, and then assemble and send another request object or objects to complete other portions of the task.

In a flowchart of an example process 300 that a client can use to get a task done (FIG. 3), the client (at stage 302), generates requests (such as database queries) to be handled by the server. At stage 304, the client identifies dependencies among the requests. For example, one request may depend upon the results of another request, for example, because they are part of an ordered sequence. At stage 306, the client generates a request object, including requests and logic that indicates how the requests may depend upon each other.

At stage 308, the client communicates the request object to the server using a computer network.

At stage 310, the client receives one or more response objects from the server. The response object(s) include a response or responses to the requests handled by the server.

The tasks that we have discussed and the requests and responses that make up one or more tasks do not necessarily (and in many cases do not) correspond directly (or even indirectly) to database commit transactions of the kind that represent business or similar transactions in a broad range of applications. (The phrase "database commit transactions" is meant to include, for example, the unit of commitment and reversibility in such applications, notably financial ones.)

For example, a database commit transaction may occur within the smallest unit of execution at the server, or may be spread across multiple actions taken at the server, or may be spread across multiple actions on the client and server and back and forth communications related to those actions. Thus, where and when a given implementation begins and ends database transactions is irrelevant to when the activities described here occur between and at the server and the client. Database transactions may extend across multiple primitive operations and/or multiple client invocations of the techniques that we describe here.

In one specific simple example, suppose that a client needs to fetch account details of a customer from a database of a server based on an account code for the customer (e.g. "ABCD1234"). On the client side, the code for assembling client requests (DAORequest) into a request object (a DAO) could be:

```
public static Account getAccountDetailsForCustomer(String
accountCode) throws Exception {
    Account account = null;
    DAOResponse daoResponse = daoCache.get(accountCode);
    if (daoResponse == null) {
        List servers =
CustomerHelper.getDBServersForCustomer(accountCode);
        DAOClient daoClient = new DAOClient(servers);
        DAORequest daoRequest = new
DAORequest("AccountDAO.getAccountWithSegments");
        daoRequest.setStringValue("accountcode", accountCode);
        String id = daoClient.addRequest(daoRequest);
        daoClient.process( );
        if (!daoClient.isError( )) {
            daoResponse = daoClient.getResponse(id);
            daoCache.add(accountCode, daoResponse);
        } else {
            throw new Exception(daoClient.getError( ));
        }
    }
    if (daoResponse != null) {
        account = new Account(daoResponse);
    }
    return account;
}
```

On the server side, the code for handling and responding to the requests in a request object could be:

```
public void getAccountWithSegments(DAORequest request,
    DAOResponse response) throws Exception {
        Accounts account = null;
        if (request.containsValue("itemid")) {
            long itemId = request.getLongValue("itemid");
            account = AccountCache.getAccount(itemId);
        } else if (request.containsValue("accountcode")) {
            String accountCode = request.getStringValue("accountcode");
            account =
AccountCache.getAccountByCode(accountCode);
        }
        if (account != null) {
            response.setValues(account.getHashMapValues( ));
            // Extract the list of segments
            response.setArrayListValue("segments",
getSegments(account));
            response.setCacheable(true);
        } else {
            throw new Exception("Account not found");
        }
        return;
}
```

The DAOClient, DAORequest, and DAOResponse are utility class abstractions in the form of objects that provide certain utility functions for the client code and the server code.

In some implementations, each request object sent to the server can include one or more DAO (Data Access Object) requests. A DAO request contains one or more procedure names (corresponding to business methods, e.g. "create email") and some data (for example, sender, recipient, list of files). Each DAO is a higher level abstraction that reduces round trips by executing multiple data or table accesses in the execution at the server of the needed business methods. That is, the DAO enables one message from the client to trigger multiple database or other actions on the server without additional round-trips of communication between the server and the client. The DAOs are constructed at a higher level of abstraction than traditional database stored procedures and provide a more efficient, flexible and extensible abstraction than a traditional remote procedure call.

In some examples, a DAO is a list of procedure names and data, encapsulated, with the Java that defines it living on the server, but in general the Java could be transmitted as part of the DAO.

The DAO is, in some implementations, a statement in an interpreted language that typically has only weak typing of its data. This is a strength in some sense in that it makes it easier to handle version control and backwards compatibility. But it may requires care in translating between weakly typed data and the more strongly typed data mechanisms of typical underlying database systems or of a language like Java.

Weak typing also makes name clashes more likely; in some implementations, business object and DAO data can be separated into separate namespaces.

In some examples, a request can carry code that optimizes searches in a distributed database (or another distributed data storage and retrieval mechanism such as a data store). For example, the code can allow the request to take into consideration the location of servers that contain a particular set of records, and delegate parts of the search to those servers. As such, the request will be performed more efficiently than it would were there no consideration about which servers contain which records. Also, in some examples, the code that optimizes searches in a distributed database is included in a DAO request.

In some implementations, the server may include a dictionary that allows it to determine which procedure names and data values (and types) are permitted or required. In the absence of such a dictionary, the client must be hard-coded with that information.

The technique can include a versioning mechanism to ensure that future versions of the system don't mix incompatible generations of client and server code. This is commonly required in client-server protocols where the two sides are not directly generated from a single source.

FIG. 4 is block diagram of an example computer system 400 that forms one of the systems of the network that is engaged in completing a task. For example, referring to FIG. 1, the client 102 or servers 104a, 104b could all be examples of the system 400 described here. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430.

The memory 420 stores information within the system 400. In some implementations, the memory 420 is a computer-readable medium. In some implementations, the memory 420 is a volatile memory unit. In some implementations, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, or some other large capacity storage device. For example, the storage device may store long-term data, such as data stored in a database residing on one of the servers 104a, 104b shown in FIG. 1.

The input/output device 440 provides input/output operations for the system 400. In some implementations, the input/output device 440 can include one or more of a network interface devices, e.g., an Ethernet card, a serial communication device, e.g., an RS-232 port, and/or a wireless interface device, e.g., and 802.11 card. A network interface device allows the system 400 to communicate using the network 108 shown in FIG. 1, for example, transmit and receive request objects and response objects. In some implementations, the input/output device can include driver devices configured to receive input data and send output data to other input/output devices, e.g., keyboard, printer and display devices 460. In some implementations, mobile computing devices, mobile communication devices, and other devices can be used.

The client 102 and servers 104a, 104b (FIG. 1) can be realized by instructions that upon execution cause one or more processing devices to carry out the processes and functions described above, for example, communicating over a network to handle requests and responses. Such instructions can comprise, for example, interpreted instructions such as script instructions, or executable code, or other instructions stored in a computer readable medium. The client 102 and servers 104a, 104b can each be distributively implemented over a network, such as a server farm, or a set of widely distributed servers or can be implemented in a single computer device. For example, the client may be implemented as a single computer device, and the servers 104a, 104b may be implemented as distributed servers. Various arrangements are possible. The servers 104a, 104b may together operate as a single system of servers, or the servers 104a, 104b may each be themselves made up of multiple server systems cooperating to carry out operations.

Although an example processing system has been described in FIG. 4, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for handling requests and/or responses, can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. The client 102 and servers 104a, 104b individually are examples of discrete systems, and they also interact in a manner such that they together form another system for handling tasks. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. For example, some of the example code described above is written in the Java language, but this is only one example and other implementations can use a different programming language. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry. Sometimes the client 102 and the servers 104a, 104b are general purpose computers, and sometimes they are custom-tailored special purpose electronic devices, and sometimes they are a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system, e.g., the components of the client 102 and/or the servers 104a, 104b, or the client 102 and/or the servers 104a, 104b themselves, can be interconnected by any form or medium of digital data communication, e.g., a communication network. Examples of communication networks include a local area network ("LAN") and a wide area network ("WAN"), e.g., the Internet. Exotic methods of communication networks include transmitting data using a physical storage medium carried by an intermediary, such as a postal mail carrier or a carrier pigeon.

A client and server may be remote from each other and interact through a communication network. The relationship of client and server arises by virtue of computer programs running on the respective computers and having a client server relationship to each other. They can alternate roles, with each being client and server in turn.

Certain features that are described that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

Although the use of Java is convenient, almost any language could be used. In practice, interpreted languages (and particularly scripting languages) may work better for the purpose.

Almost any network application might use client and server interaction as described above. And similar techniques could also be used in the reverse direction, for example, for "push" requests, in which a server tells a client to update information.

The system can be used for remote access to database services, particularly by a MTA (Message Transfer Agent) for mail delivery and or by a LDAP (Lightweight Directory Access Protocol) server. It can almost completely replace the use of ProtoBuf (Google's Data Interchange Format) in some systems.

These techniques could be used in a much wider range of situations, including administrative interfaces, POP (Post Office Protocol) servers, and file servers. More broadly, it could be used to replace anything that facilitates network protocols using XML; XML data structures commonly transmitted over the network could be replaced with DAO's or their equivalent.

The invention claimed is:

1. A computer-implemented method comprising
receiving at least one database request for querying information included in a database;
reducing a latency between a beginning and an end of a task, the task corresponding to the at least one database request, that is to be performed between a first system and a second system, a performance of the task involving at least two database actions, the task causing the at least two database actions to be handled by the second system, handling of a second of the at least two database actions by the second system depending on an output resulting from handling a first of the at least two database actions by the second system,
the reducing of the latency including:
forming a package to include the at least two database actions and logic executable at the second system, the logic, when executed, providing instructions to the second system on how the handling of the second database action should proceed based on the output resulting from the handling of the first database action,
wherein forming the package includes generating executable code that: (a) describes locations of servers storing particular database records relevant to the at least two database actions, and (b) enables the second system to perform the at least two database actions based on which of the servers store the respective database records, and wherein the formed package includes the executable code; and
sending the package including information about the at least two database actions and the code in a single communication over a network from the first system to the second system and receiving one or more corresponding results from the second system.

2. The method of claim 1 in which the first system comprises a client, and the second system comprises a server.

3. The method of claim 1 in which at least one of the database actions is handled by accessing a database at the second system.

4. The method of claim 1 in which the two database actions have an order in which they are to be handled.

5. The method of claim 1 in which the package comprises an object for use in an object-oriented programming system.

6. The method of claim 5 in which the object comprises a first function reference corresponding to first instructions for handling the first database action and a second function reference corresponding to second instructions for handling the second database action, each function reference identifying a function executable at the second system.

7. The method of claim 1 in which the logic is interpretable at the second system.

8. The method of claim 1 in which the one or more results are received from the second system all at once.

9. The method of claim 1 in which the one or more results are received from the second system incrementally as the database actions are handled.

10. The method of claim 1 in which handling of a second of the at least two database actions by the second system depending on an output resulting from handling a first of the at least two database actions by the second system is a dependency that comprises a sequencing.

11. The method of claim 1 in which the handling of the one database action at the second system includes primitive operations to be performed at the second system, and a database transaction may extend across two or more of the primitive operations, or across two or more packages sent to the second system, or both.

12. The method of claim 1 in which the code includes instructions for optimizing searches based on locations of records in a distributed database or data store.

13. The method of claim 1 in which the logic comprises a first reference to first instructions for handling the first database action, and a second reference to second instructions for handling the second database action.

14. The method of claim 13 in which the logic that will control the handling of the first database action comprises a call to a first function identified by the first reference and comprises processing an output of a second function identified by the second reference.

15. The method of claim 1 in which the package comprises first instructions for handling the first database action and second instructions for handling the second database action.

16. The method of claim 1 in which the logic comprises a first reference identifying a first function executable at the second system for handling the first database action and a second reference identifying a second function executable at the second system for handling the second database action.

17. The method of claim 1 in which the package further includes one or more references to data available at the second system to be used in handling the two database actions.

18. The method of claim 1 in which the package comprises a program for determining what resources are available at the second system and directing the second system to handle the two database actions in accordance with the determination, the handling of the two database actions performed without interacting with the first system.

19. The method of claim 1 in which the logic, when executed, directs the second system to not proceed with the handling of one of the two database actions based on the output from the handling of another of the two database actions.

20. The method of claim 1 in which the code provides information on which servers should be used to conduct the one or more database actions based on locations of servers that store particular records in a distributed data store.

21. A first system comprising
one or more processors configured for
  receiving at least one database request for querying information included in a database;
  identifying a task corresponding to the at least one database request, the task to be performed between a first system and a second system, a performance of the task involving at least two database actions to be performed by a second system, handling of a second of the at least two database actions by the second system depending on an output resulting from handling a first of the at least two database actions by the second system,
  forming a package to include the at least two database actions and logic executable at the second system, the logic, when executed, providing instructions to the second system on how the handling of the second database action should proceed based on the output resulting from the handling of the first database action,
  wherein forming the package includes generating executable code that: (a) describes locations of servers storing particular database records relevant to the at least two database actions, and (b) enables the second system to perform the at least two database actions based on which of the servers store the respective database records, and wherein the formed package includes the executable code; and
sending the package including information about the at least two database actions and the code in a single communication over a network from the first system to the second system and receiving one or more corresponding results from the second system.

* * * * *